United States Patent [19]

Lepoutre

[11] Patent Number: 5,603,358
[45] Date of Patent: Feb. 18, 1997

[54] FLEXIBLE CYLINDRICAL TUBE FOR CONDUCTING GAS

[75] Inventor: Edmond P. J. Lepoutre, Curitiba, Brazil

[73] Assignee: Westaflex Tubos Flexiveis Ltda, Brazil

[21] Appl. No.: 379,253

[22] Filed: Jan. 27, 1995

[30] Foreign Application Priority Data

Jan. 28, 1994 [BR] Brazil ................................. 7400072 U

[51] Int. Cl.⁶ ..................................................... F16L 9/14
[52] U.S. Cl. .......................... 138/149; 138/121; 138/131; 138/177
[58] Field of Search ..................................... 138/149, 121, 138/122, 127, 129, 137, 138, 144, 177, 178, DIG. 9, 131

[56] References Cited

U.S. PATENT DOCUMENTS

| | | | |
|---|---|---|---|
| 1,190,292 | 7/1916 | Hopkins | 138/126 X |
| 2,906,638 | 9/1959 | Herman | 138/126 X |
| 4,013,102 | 3/1977 | DeLorean et al. | 138/149 X |
| 4,153,080 | 5/1979 | Murray, Jr. et al. | 138/126 |
| 4,547,193 | 10/1985 | Rydell | 138/127 X |
| 4,926,909 | 5/1990 | Salinas | 138/127 X |
| 5,325,893 | 7/1994 | Takagi et al. | 138/143 |

*Primary Examiner*—Patrick Brinson
*Attorney, Agent, or Firm*—Renner, Kenner, Greive, Bobak, Taylor & Weber

[57] ABSTRACT

Flexible cylindrical tube for conducting air or other gases, of use in particular in the automobile industry where its purpose is to, among other things, conduct air to internal combustion engines, and comprising at least one flexible cylindrical covering (1, 3) made of a material considered to be soft and noise-absorbent, characterized by a support-tape (2) provided with apertures (2A) against which the covering (1, 3) is placed.

13 Claims, 2 Drawing Sheets

FLEXIBLE CYLINDRICAL TUBE FOR CONDUCTING GAS

The invention relates to flexible cylindrical tubes or hoses for conducting air or other gases employed in particular in the automobile industry where their purpose is to, among other things, conduct air to the internal combustion engines while avoiding an excessive propagation of noise of mechanical origin, which aspect is added to the resistance to heat and vibrations, a longer life and a lower production cost.

At the present time, flexible tubes exist which are employed in different industries, among which the automobile industry. These tubes are manufactured from braided or woven threads on supports of threads which are metallic or otherwise. Note that these flexible tubes avoid, by their construction, an excessive propagation of noise of mechanical origin. However, the method for manufacturing these flexible tubes is relatively slow and consequently of high cost. It obliges the manufacturer to subject the product to numerous treatments to obtain the desired construction as concerns the format and the required fluidtightness of each flexible tube.

There also exist in the art flexible tubes manufactured from helical superimpositions of uniform tapes or bands, corrugated or otherwise, of different materials which may be adhered or bonded together by thermo-adhesives. Note that these uniform tapes are made from aluminium, plastics, paper and/or glass fibres, and that the method of manufacturing these flexible tubes is rapid. The superimpositions of the uniform tapes impart good properties of resistance and fluidtightness to the flexible tube. However, this type of tube has a tendency to excessively propagate noise of mechanical origin.

It should also be added that the method of manufacturing by superimposition of different layers of uniform tapes, corrugated or otherwise, wound onto themselves in a helical manner, imparts a certain consistency and a resistance to vibrations to the tube. However, the described superimpositions do not permit the use of soft tape materials which do not transmit noise, without a uniform support.

The improvements afforded by the present invention have been designed and arranged to eliminate the aforementioned drawbacks. A flexible cylindrical tube has been developed for conducting air or other gases, this tube being employed in particular in the automobile industry where its purpose is to, among other things, conduct air to the internal combustion engines, and comprising at least one flexible cylindrical covering made of a material considered to be soft and noise absorbent, characterized by a support-tape provided with apertures against which said covering is placed. The apertured support-tape, for example of metal (steel, aluminium, etc.), imparts a radial consistency and flexibility to the tube while avoiding an excessive propagation of noise by the development of acoustic characteristics. This is due to the apertures of the support-tape.

A tube for conducting a gas in a pulsed mode exhibits a resonance frequency depending among others on its lenght. At this resonance frequency the wave magnitude is maximum and the tube is therefore very noisy.

The presence of the covering(s) makes it possible, possibly with a partial passage of the gas through the covering(s), depending on the pressure gradient between the tube and the outside and on the applications, to minimize the pressure maximums which generate noise.

The covering may be a cloth of any nature, felt, paper or any other noise-absorbent material, all these materials being considered as soft materials. It may also be composite, i.e. comprise at least two layers. Such a covering may be provided on the interior and/or the exterior of the support-tape.

In the three foregoing cases, during the operation of a machine, the mechanical noise emitted by the latter are converted into pulses or waves inside the tube. The waves pass through the apertures of the support-tape and are damped, before and/or after, by the material making up the covering or coverings which absorb the noise.

The support-tape is for example formed by a perforated band, a band of netting, a braid or a mesh.

The invention will be better understood from the following further description with reference to the accompanying drawings in which.

As shown in FIGS. 1 to 5 and according to the foregoing explanation, the tube, hose or duct according to the invention comprises a helical and corrugated support-tape 2 made from metal or any other easily shaped material provided with apertures 2A allowing the passage of sound waves, and at least one covering 1, 3 of a soft material which absorbs vibrations and therefore noise.

This soft material is for example a cloth of any suitable type, paper or felt, optionally covered with an outer layer 4, for example of adhered bitumen.

As concerns the apertures 2A, their type depends on the structure of the support-tape 2. They are functionally defined as being physical passages through the wall of the support-tape allowing the free radial passage through the latter of the sound waves travelling through the tube. For example, in the case of a perforated metal band, these apertures are perforations. In addition, these apertures form axial discontinuities in the material of the support-tape, these discontinuities opposing the axial propagation of sounds in the very material of the support-tape.

Figure 1:
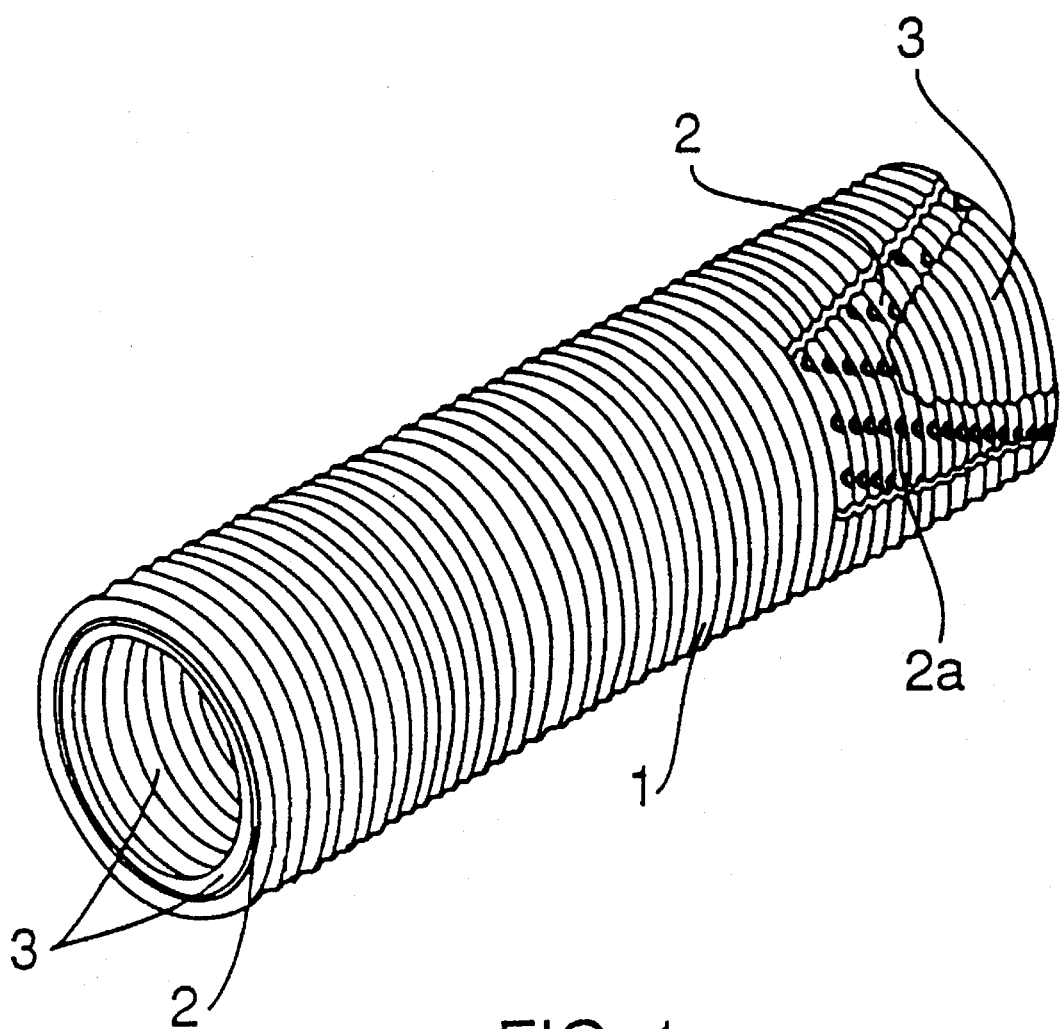
FIG. 1 is a perspective view, with parts cut away, of a flexible cylindrical tube according to a first embodiment of the invention comprising a perforated support-tape placed between an exterior covering and an interior covering having a smaller diameter, both coverings being cylindrical and flexible.
Figure 2:
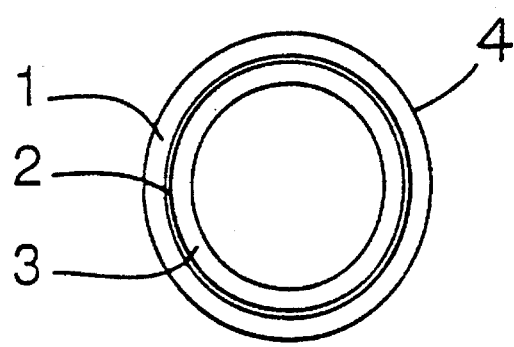
FIG. 2 is a diagrammatic cross-sectional view of the tube shown in FIG. 1 and showing an outer covering.

The flexible cylindrical tube shown in FIGS. 1 and 2 is formed of a central support-tape 2 on which are placed by superimposition, helically or otherwise, and by adhesion or otherwise, two flexible coverings, namely an exterior covering 1 having a diameter larger than that of the support-tape and an interior covering 3 of smaller diameter, these coverings being made from any suitable type of cloth or material absorbing noise, considered as a soft material in accordance with the foregoing description.

Consequently, the sound waves which enter the flexible cylindrical tube are initially damped and filtered by the noise-absorbent soft material of the interior covering. They then pass through the apertures 2A of the support-tape 2 and are finally damped by the noise-absorbent soft material of the exterior covering 1.

Figure 3:
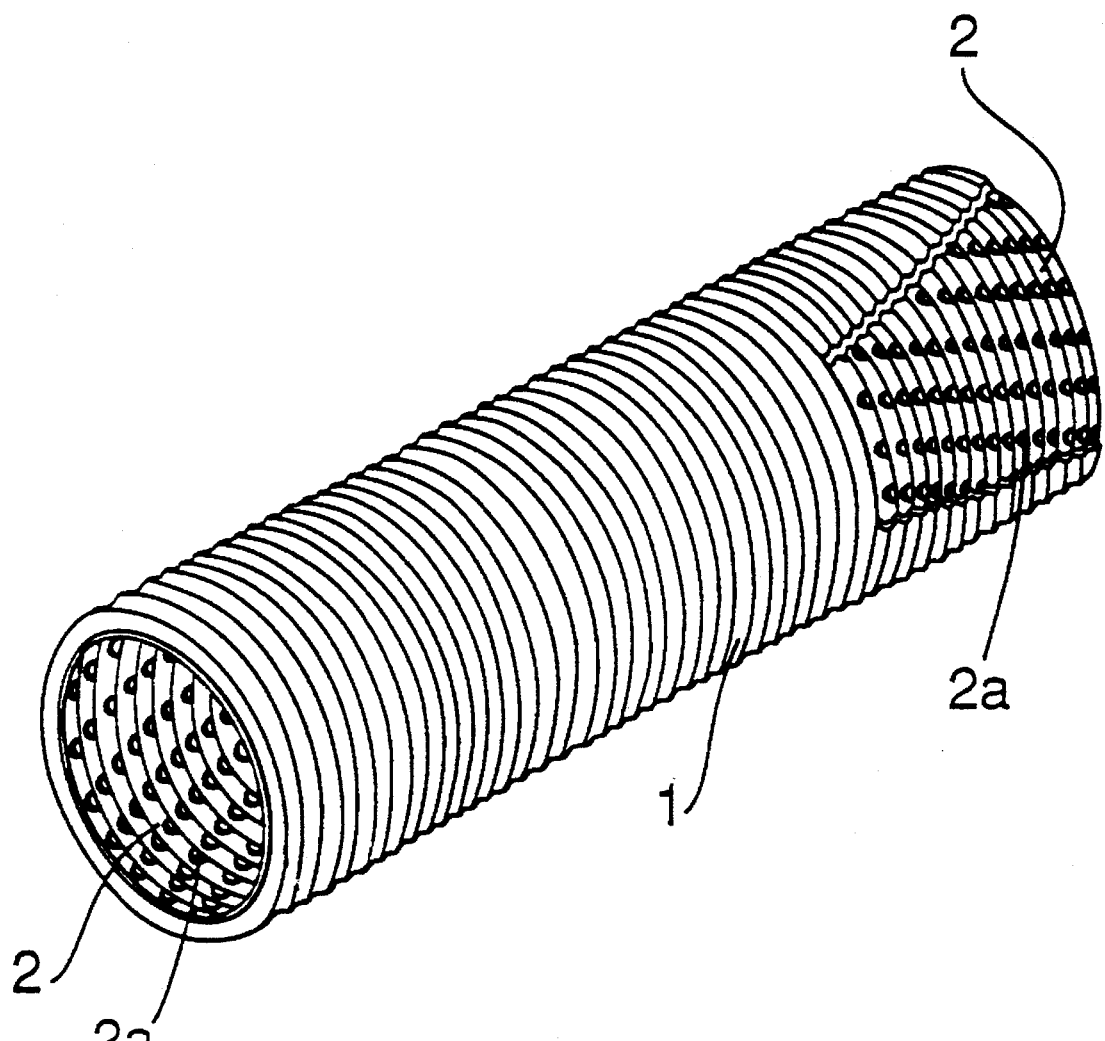
FIGS. 3 and 4 are views respectively similar to FIGS. 1 and 2 of a second embodiment of the invention.
Figure 4:
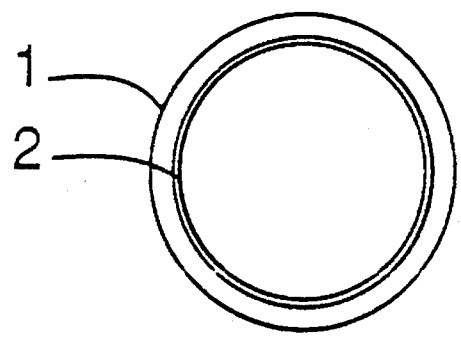

As shown in the embodiment of FIGS. 3 and 4, the tube may comprise the previously-defined support-tape 2 and only the aforementioned exterior covering 1 by the superimposition, helically or otherwise, and by adhesion or otherwise, of this covering. In this tube, the sound waves are initially absorbed by the apertures 2A of the support-tape 2 and are subsequently damped by the noise-absorbent soft material of the exterior covering 1.

Figure 5:
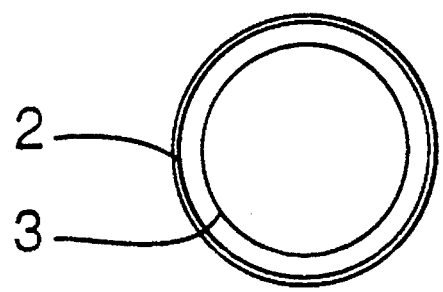
FIG. 5 is a view similar to FIG. 2 of a third embodiment of the invention.

As shown in the embodiment of FIG. 5, the tube may comprise the support-tape 2 defined hereinbefore and only the interior covering 3 by the superimposition, helically or otherwise, and by adhesion or otherwise of this covering. The flexible cylindrical tube will therefore be composed of an exterior support-tape 2 with its apertures 2A, and a cylindrical and flexible interior covering 3 of smaller diameter. In this tube, the sound waves are initially damped and filtred by the noise-absorbent soft material of the interior covering 3. Then, what remains of the waves passes through the apertures 2A of the support-tape 2.

The invention therefore provides a flexible cylindrical tube which avoids the excessive propagation of noise of mechanical origin owing to improved acoustic conditions, in this way contributing to the substantial reduction of sound indices, in particular in large town or industrial centres.

I claim:

1. A flexible cylindrical tube for conducting air or other gases, employed in particular in the automobile industry where its purpose is to, among other things, conduct the air to the internal combustion engines, comprising at least one flexible cylindrical covering made of a soft and noise-absorbent material and an apertured support-tape against which said covering is placed, at least one of said support-tape and covering being corrugated.

2. A tube according to claim 1, wherein the covering is made of a material belonging to the group comprising cloth, felt or paper.

3. A tube according to claims 1 or 2, wherein the support-tape is metal.

4. A tube according to claims 1 or 2, the support-tape belonging to the group comprising a perforated band, a band of netting, a braid and a mesh.

5. A tube according to claims 1 or 2, wherein a single covering is provided which constitutes an exterior covering having a diameter larger than that of the support-tape.

6. A tube according to claims 1 or 2, wherein a single covering is provided which constitutes an interior covering having a diameter smaller than that of the support-tape.

7. A tube according to claims 1 or 2, wherein there are provided an exterior covering having a diameter larger than that of the support-tape, and an interior covering having a diameter smaller than that of the support-tape.

8. A tube according to claim 5, wherein the exterior covering is itself covered externally, for example by adhered bitumen.

9. A tube according to claim 7, wherein the exterior covering is itself covered externally, for example by adhered bitumen.

10. A tube according to claims 1 or 2, wherein at least one of said support-tape and covering is produced by a helical winding thereof.

11. A tube according to claims 1 or 2, wherein the support-tape and the covering are adhered together.

12. A flexible cylindrical tube for conducting air or other gases, employed in particular in the automobile industry where its purpose is to, among other things, conduct the air to the internal combustion engines, comprising a cylindrical covering made of a soft and noise-absorbent material, and an apertured support-tape against which said covering is placed, said covering constituting an exterior cover having a diameter larger than that of said support-tape, said exterior cover being itself covered externally, for example, by adhered bitumen.

13. A flexible cylindrical tube for conducting air or other gases, employed in particular in the automobile industry where its purpose is to, among other things, conduct the air to the internal combustion engines, comprising an apertured support-tape, an exterior covering placed against said support-tape and having a larger diameter than that of said support-tape, an interior covering placed against said support-tape and having a diameter smaller than that of said support-tape, said coverings being made of a soft and noise-absorbent material, said exterior covering being itself covered externally, for example, by adhered bitumen.

* * * * *